(12) United States Patent
Ohshima

(10) Patent No.: US 7,056,216 B2
(45) Date of Patent: Jun. 6, 2006

(54) USER INTERFACE APPARATUS, USER INTERFACE METHOD, GAME APPARATUS, AND PROGRAM STORAGE MEDIUM

(75) Inventor: Toshikazu Ohshima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/510,334

(22) Filed: Feb. 22, 2000

(65) Prior Publication Data

US 2002/0072416 A1 Jun. 13, 2002

(30) Foreign Application Priority Data

Jun. 11, 1999 (JP) .................................. 11-165709

(51) Int. Cl.
A63F 11/00 (2006.01)

(52) U.S. Cl. .......................................... 463/36; 463/37

(58) Field of Classification Search ............ 463/36–39; 434/252
See application file for complete search history.

(56) References Cited

U.S. PATENT DOCUMENTS

| | | | | |
|---|---|---|---|---|
| 4,613,139 A | * | 9/1986 | Robinson, II | ............ 273/148 B |
| 5,323,174 A | * | 6/1994 | Klapman et al. | ........... 345/156 |
| 5,488,362 A | * | 1/1996 | Ullman et al. | ................ 341/20 |
| 5,638,300 A | * | 6/1997 | Johnson | ....................... 702/153 |
| 5,655,223 A | * | 8/1997 | Cozza | ........................ 434/252 |
| 5,826,578 A | * | 10/1998 | Curchod | .................... 434/252 |
| 5,846,134 A | * | 12/1998 | Latypov | ....................... 463/46 |
| 5,913,727 A | * | 6/1999 | Ahdoot | ........................ 463/39 |
| 5,930,741 A | * | 7/1999 | Kramer | ....................... 702/153 |
| 5,984,684 A | * | 11/1999 | Brostedt et al. | ............ 434/252 |
| 6,001,065 A | * | 12/1999 | DeVito | ........................ 600/544 |
| 6,030,290 A | * | 2/2000 | Powell | ....................... 463/36 |
| 6,106,397 A | * | 8/2000 | Phillips | ....................... 463/36 |
| 6,141,643 A | * | 10/2000 | Harmon | ....................... 704/271 |
| 6,270,414 B1 | * | 8/2001 | Roelofs | ....................... 463/36 |
| 6,757,068 B1 | * | 6/2004 | Foxlin | ........................ 356/620 |

FOREIGN PATENT DOCUMENTS

| | | |
|---|---|---|
| JP | 3-110421 | 5/1991 |
| JP | 4-257014 | 9/1992 |
| JP | 9-054542 | 2/1997 |
| JP | 10-179933 | 7/1998 |
| JP | 10-260773 | 9/1998 |

* cited by examiner

Primary Examiner—Xuan M. Thai
Assistant Examiner—Robert Mosser
(74) Attorney, Agent, or Firm—Fitzpatrick, Cella, Harper & Scinto

(57) ABSTRACT

There is disclosed a user interface apparatus to which the user (player) can easily sensuoulsy become accustomed, and which can accurately recognize instructions (commands) that the user (player) intended. The user interface apparatus has a location/posture sensor (100) attached to the head of the user, and a location/posture sensor (200) attached to his or her hand, analyzes hand action on the basis of the relative position of the location/posture of the hand with respect to those of the head, and estimates the current action state from the analysis result. The apparatus then determines a user instruction (player command) on the basis of the action state.

11 Claims, 18 Drawing Sheets

USER INTERFACE APPARATUS, USER INTERFACE METHOD, GAME APPARATUS, AND PROGRAM STORAGE MEDIUM

FIELD OF THE INVENTION

The present invention relates to a user interface apparatus and method, and a game apparatus, which generate an instruction (or command) by adequately detecting player's (user's) actions in, e.g., an action game.

BACKGROUND OF THE INVENTION

A current personal computer system uses as a user interface a pointing device such as a mouse, track pad, or the like. However, the user must hold the mouse and slide it on a given surface. On the other hand, the user must rub against the surface of the track pad with his or her hand. Thus, these pointing devices limit user's actions. A GUI (Graphical User Interface) used in the personal computer system or the like is that for a two-dimensional space, and is not suitable for that in a three-dimensional space.

For these reasons, it is a common practice in the technical field of VR (Virtual Reality) or AR (Augmented Reality) to input commands to the system by switch operations of an input device which is held by a user's (player's) hand and has switch buttons, and the like.

In the prior art in which commands are input by switch operations on the input device having button switches and the like, the number of types or number of commands (instructions) is limited by the number of buttons. If the number of types or number of commands (or instructions) is increased, the number of buttons increases inevitably. As a result, the input device becomes large in size, and the load on the user (player) becomes heavier as he or she must learn the button positions.

Learning the button positions imposes a heavy load on the user since the command contents do not match the button positions. To put it differently, expressing various command contents (e.g., "forward movement", "backward movement", "stop", and the like) by one operation, i.e., depression of a button (or a switch) is difficult if not impossible.

On the other hand, in the VR (Virtual Reality) or AR (Augmented Reality) field, a device for simulating user's (player's) hand actions has been proposed. For example, in one technique, a sensor for detecting the bent angle of a joint of a finger is attached to a hand of the user, and a CG (computer graphic) image is generated in correspondence with the bent angle of the finger detected by that sensor. However, this technique aims at simulating hand actions of the user, and it is impossible to apply this technique to that for recognizing the user (player) instructions (or commands) in practice.

In this technique, for example, when the user stretches the arm forward, a CG image with the arm stretched forward is generated, and display of such image can be interpreted to be a result of a user instruction or forward stretching of the arm in the broad sense. However, if user commands are generated by only hand actions, every hand actions are unwantedly interpreted as commands, and such interface has poor reliability.

The present invention has been made to solve the conventional problems and has as its object to provide a user interface apparatus, user interface method, and game apparatus, to which the user (player) can easily sensuously become accustomed, and which can accurately recognize instructions (commands) that the user (player) intended.

SUMMARY OF THE INVENTION

In order to achieve the above object, a user interface apparatus according to the present invention comprises:
a first sensor attached to a first portion of a body of a user;
a second sensor attached to a second portion different from the first portion;
means for generating action information of the second portion on the basis of a relative position of the second portion with respect to the first portion, which is detected by the first and second sensors; and
determination means for determining a user instruction corresponding to the generated action information.

Also, a game apparatus according to the present invention comprises:
a first sensor for detecting a location/posture of a head of a player;
a second sensor for detecting a location/posture of a hand or arm;
means for estimating an action of the player on the basis of a relative location/posture of the hand or arm with respect to the location/posture of the head, which are detected by the first and second sensors; and
means for outputting a player command corresponding to the estimated action.

Likewise, according to the present invention, a user interface method for outputting a user instruction to a predetermined apparatus or program, comprises:
the step of detecting a location of a first portion of a body of a user and a location of a second portion different from the first portion using first and second sensors attached to the user; and
the step of determining a user instruction on the basis of a relative position of the second portion with respect to the first portion, which are detected by the first and second sensors, and outputting the determined user instruction to the apparatus or program.

In these inventions, when the user (player) expresses his or her intention or instruction by his or her own action, he or she often expresses it by a combination of actions of a plurality of his or her body portions. Such combination of actions can be estimated by detecting the location of the second portion relative to the first portion, as described above.

The user or player normally expresses an action by a relative location with respect to his or her field-of-view direction. The field-of-view direction is roughly determined by the head location. Hence, according to a preferred aspect of the present invention, the first portion is a head.

According to a preferred aspect of the present invention, the second portion is a hand. This is because it is easiest for the user to express an action by hand.

According to a preferred aspect of the present invention, the first (second) sensor detects a location or location/posture of the first (second portion.

User's (player's) action is preferably recognized as a state change. Hence, according to a preferred aspect of the present invention, information which pertains to a state change of the second portion with respect to a location of the first portion, and information which pertains to a location change velocity of the state change are detected.

According to a preferred aspect of the present invention, information which pertains to a state change of the second portion with respect to a location of the first portion, and information which pertains to a location change acceleration of the state change are detected.

According to a preferred aspect of the present invention, information which pertains to a posture of the second portion with respect to a posture of the first portion is detected.

According to a preferred aspect of the present invention, information which pertains to a moving direction of a location of the second portion with respect to a posture of the first portion is detected.

Various methods of analyzing an action state are available. According to claim 6 as a preferred aspect of the present invention, a value of the relative position of the second portion with respect to the first portion, a plurality of state values which are defined in advance as a result of transition of the value, and a plurality of different user instruction values corresponding to the plurality of state values are stored.

A user instruction or command is composed of a plurality of portions in practice, and it is advantageous for a program to individually execute those portions of the instruction or command. Hence, according to a preferred aspect of the present invention, the determined user instruction or command is decomposed into a plurality of instruction operands, and the operands are output.

According to another preferred aspect of the present invention, when it is determined that a relative relationship between a location/posture of a head detected by the first sensor, and a location/posture of a hand detected by the second sensor indicates an action of the user whose line of sight is pointing to a predetermined portion of the hand, a user instruction for outputting an operation guidance (so-called on-line HELP) is generated.

According to a preferred aspect of the present invention, a third sensor for detecting a bent angle of a finger is further used.

When the present invention is applied to the game apparatus, a display device is preferably used. Hence, the game apparatus according to a preferred aspect of the present invention comprises display means for displaying an image of a game scene in front of the head of the player for the player. Furthermore, the display means is preferably a head-mounted display.

When the present invention is applied to the game apparatus, three steps including preparation, execution, and return steps, are preferably prepared for the player command. According to a preferred aspect of the present invention, the steps are respectively defined as:

a preparation action step for the first player command when the location of the hand of the player moves to a position behind a position in front of a face of the player;

an execution step for the first player command when the location of the hand moves forward from a rear position after the preparation action; and a return action step for the first player command when the location of the hand returns to a position of the face of the player after the forward movement.

Note that the above object can also be achieved by a program storage medium that stores a computer program for implementing the aforementioned user interface method.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

A game apparatus to which a user interface of the present invention is applied will be described in detail hereinafter with reference to the accompanying drawings. As will be apparent from the following description of the embodiment, the user interface of the present invention can be applied to a personal computer system or workstation system for providing a VR or AR environment to the user in addition to the game apparatus by modifying the present invention within the scope of the invention.

Figure 1:
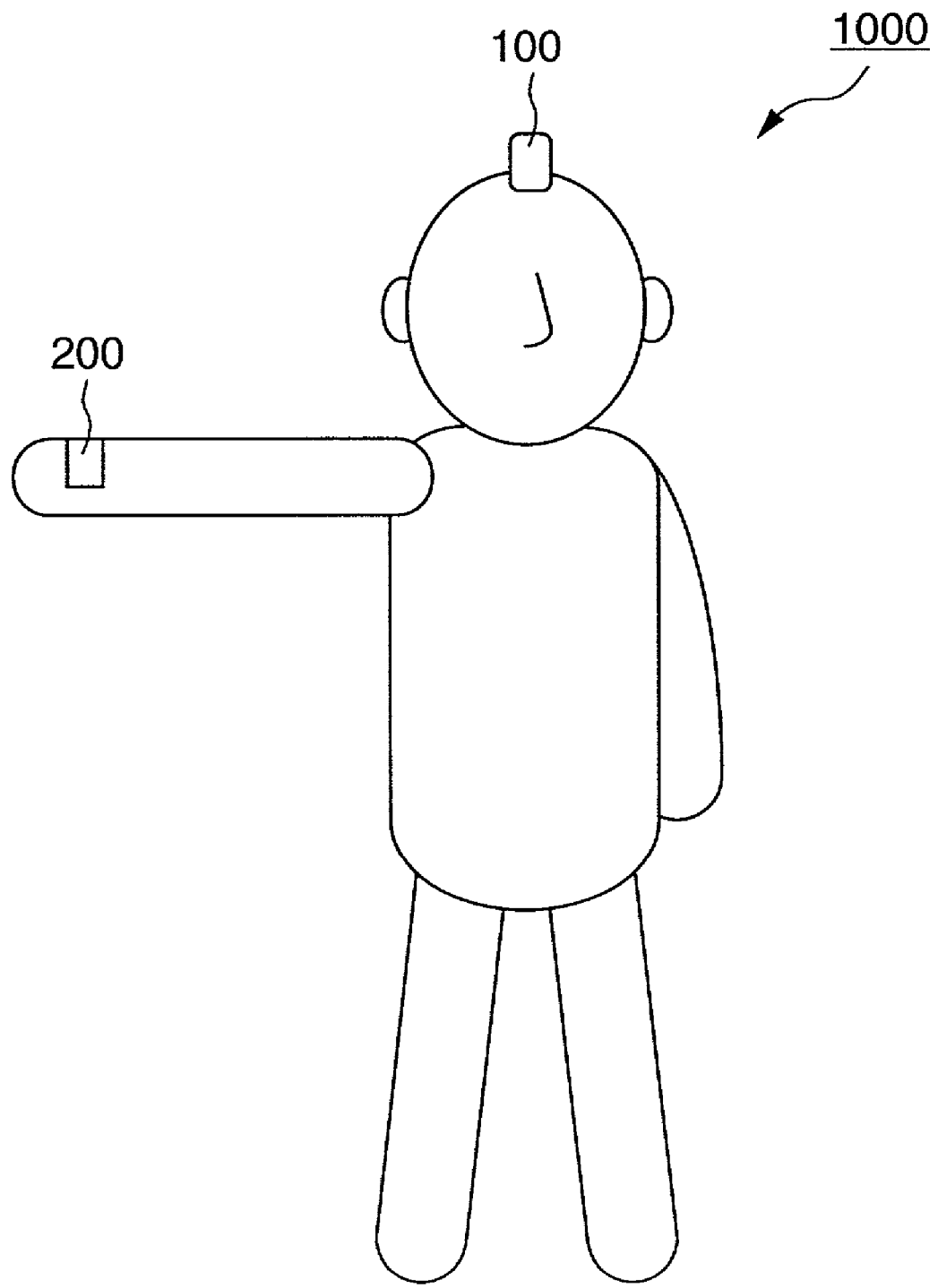
FIG. 1 is a view for explaining the layout of sensors attached to a player who joins in a game system according to an embodiment of the present invention.

FIG. 1 shows a user 1000 who manipulates the game apparatus of this embodiment. A magnetic sensor 100 as an example of a location/posture detection means is attached to the head of the user 1000, and a magnetic sensor 200 is also attached to a hand. The magnetic sensors output electrical signals including information of a three-dimensional location (x, y, z) and posture (roll, pitch, yaw) of the portions where they are attached.

Figure 2:
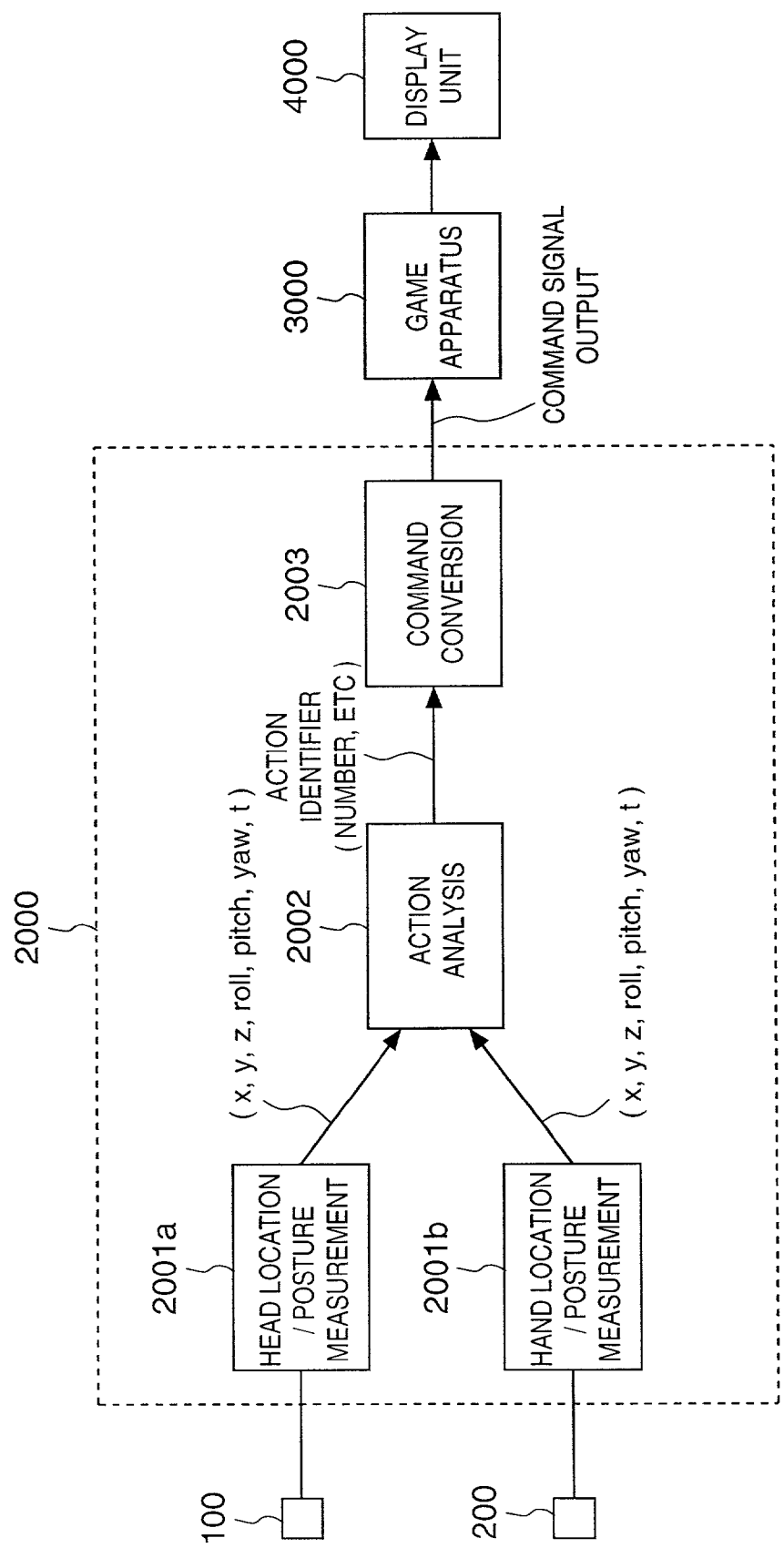
FIG. 2 is a block diagram for explaining the arrangement of the game system according to the embodiment of the present invention.

FIG. 2 shows the game apparatus system of this embodiment. Referring to FIG. 2, the game system of this embodiment has a command generation unit 2000 for receiving signals from the two sensors and converting them into a command, and a game apparatus 3000. The command generation unit 2000 analyzes an action of the user 1000 on the basis of the output signals from the sensors 100 and 200, and generates a command in accordance with the analysis result. The generated command is sent to the game apparatus 3000, which executes the command, i.e., the game progresses.

The game apparatus 3000 displays progress of the game on a display unit 4000 such as a display monitor, a head-mounted display (HMD) the user wears on his or her head, or the like, and the user can make actions such as loading, shooting, defense, and the like with respect to a "target" as a CG image generated by the game apparatus 300 within the displayed virtual space.

The arrangement and operation of the command generation unit 2000 will be described below. As shown in FIG. 2, the unit 2000 has location/posture measurement sections 2001a and 2001b, action analysis section 2002, and command conversion section 2003.

The location/posture measurement sections 2001a and 2001b convert electrical signals input from the location sensors 100 and 200 into six each coordinate values representing the locations/postures of the individual portions, and send them to the action analysis section 2002. The location/posture measurement sections 2001a and 2001b have internal clocks to measure measurement times t in addition to the six each coordinate values of the locations/postures, and output the measured times to the action analysis section 2002.

The action analysis section 2002 analyzes an action in consideration of not only the absolute locations/postures of the head and hand but also their relative location/posture. This is for the following reason. That is, a person normally expresses his or her own intention by actions of a plurality of body portions. In other words, when the location/posture of only one portion are detected and the user's intention is estimated based on them, many errors are produced even when the detected location/posture have high precision. For example, as for a forward stretching action of the arm, a forward stretching action of the arm with the head facing forward has a meaning different from that with the head facing another direction. For example, if the action "to stretch the arm forward" means "attack", since attack is normally done with the player's head facing the target (i.e., in the stretching direction of the arm), the player may intend an action other than attack if he or she stretched the arm with the head facing another direction. Hence, if no posture is taken into consideration, a forward stretching action of the arm with the head facing another direction is highly likely to be erroneously recognized as attack. For this reason, in this embodiment, the estimation precision of the user's intention is improved by taking relative location/posture (e.g., the location/posture of the hand relative to those of the head) into consideration.

Figure 3:
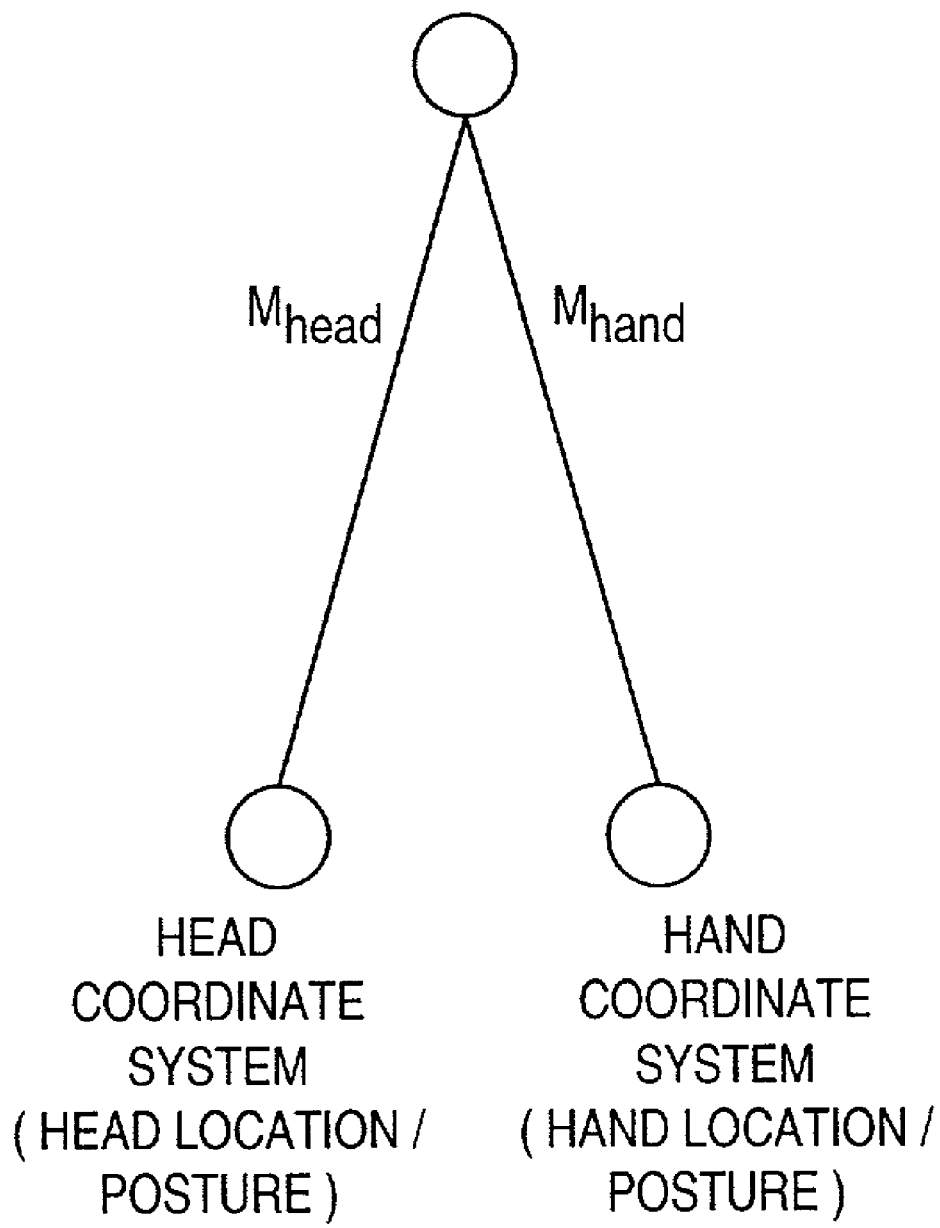
FIG. 3 is a view for explaining the relationship between the head and hand coordinate systems when viewed from a reference coordinate system as the center.
Figure 4:
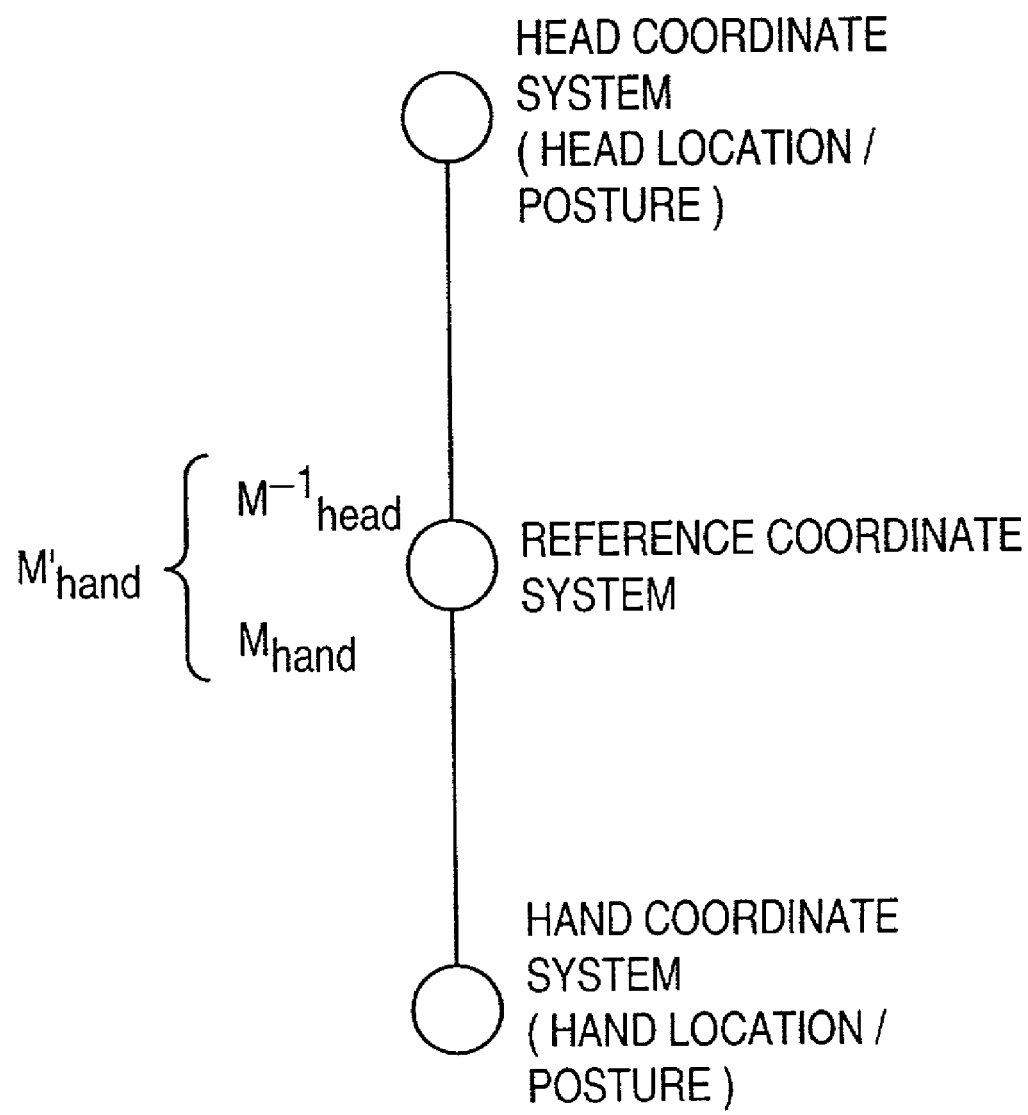
FIG. 4 is a view for explaining the relationship between the head and hand coordinate system when viewed from the head coordinate system as the center.
Figure 5:
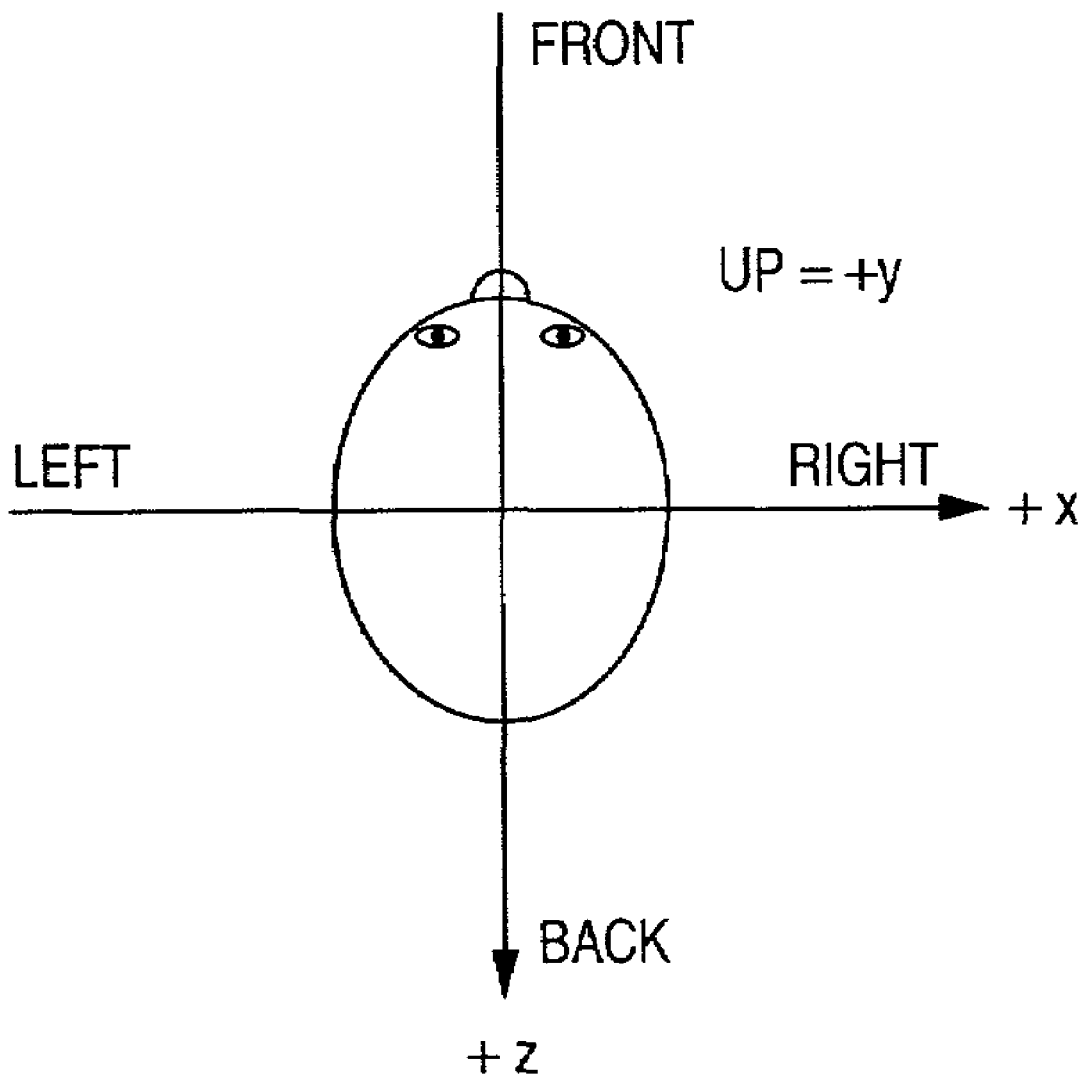
FIG. 5 is a view for explaining setups of a coordinate system of a head sensor 100 according to the scheme shown in FIG. 4.
Figure 6:
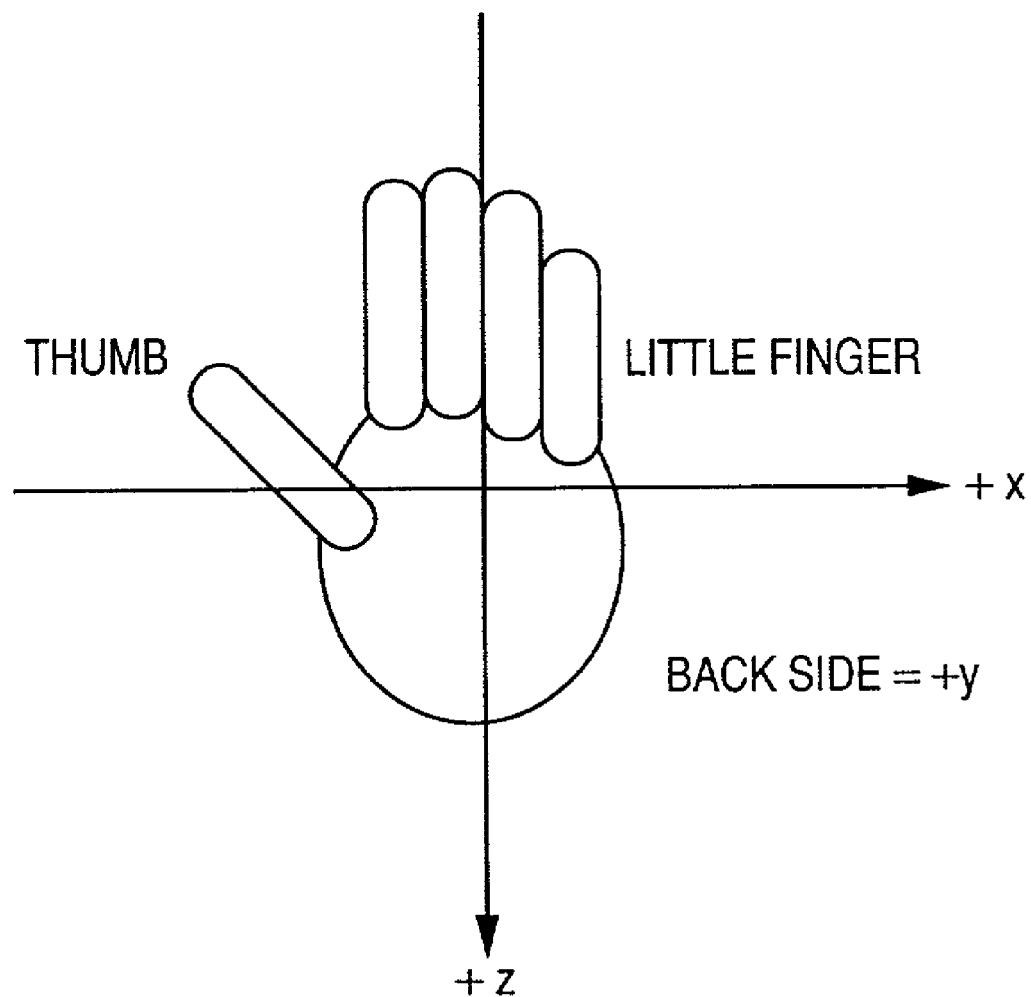
FIG. 6 is a view for explaining setups of a coordinate system of a hand sensor 200 according to the scheme shown in FIG. 4.

FIG. 3 shows the relationship between the locations/postures of the head and hand in a reference coordinate system, and FIG. 4 shows the relationship between the locations/postures of the head and hand in a head coordinate system. FIGS. 5 and 6 respectively show the head and hand coordinate systems.

Figure 7:
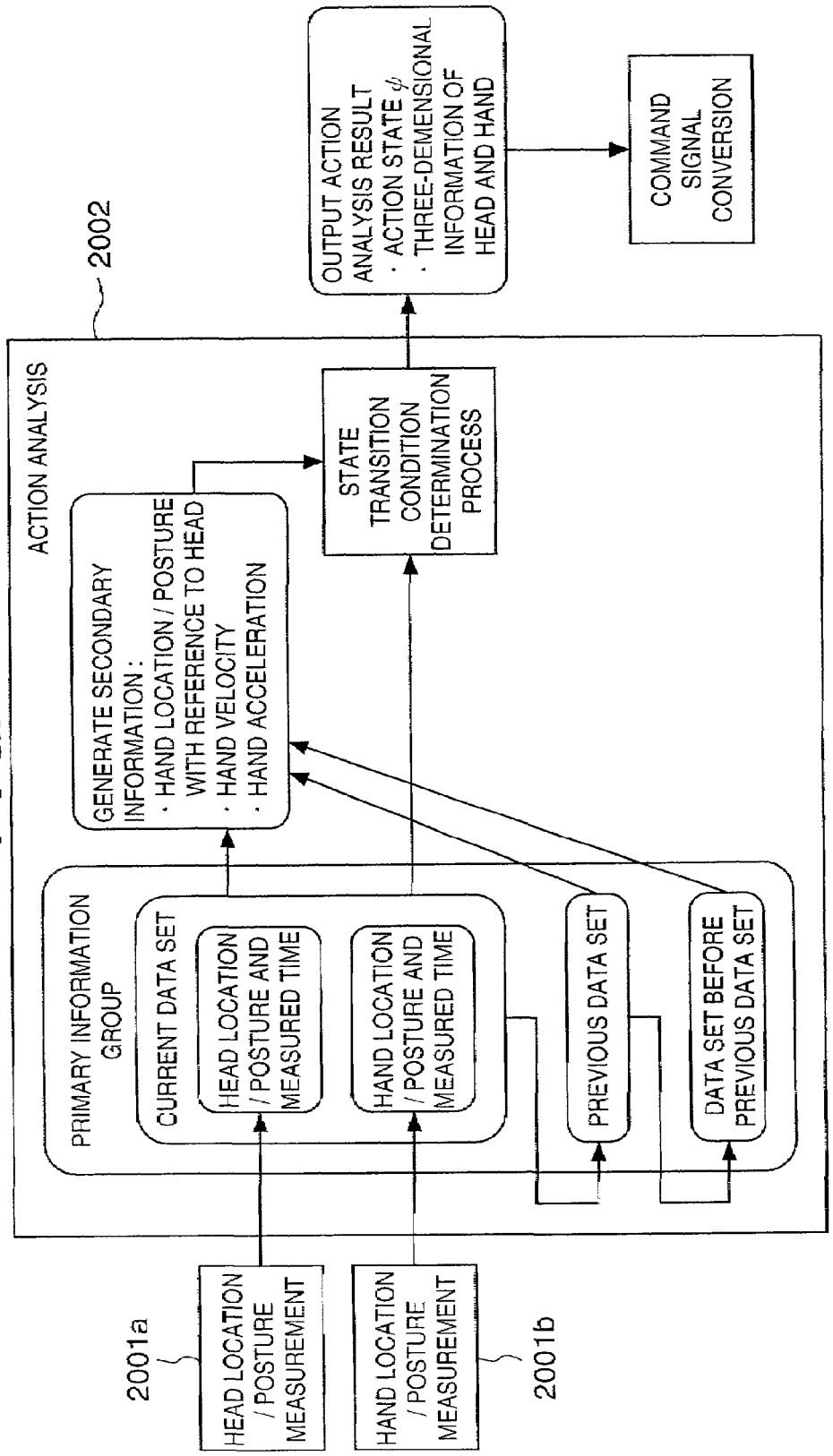
FIG. 7 is a block diagram for functionally explaining the arrangement of a command generation unit 2000.

FIG. 7 shows the functions of the action analysis section 2002. The functions shown in FIG. 7 are implemented by the control sequence according to the flow chart shown in FIG. 8. According to the flow chart shown in FIG. 8, after starting the process, three-dimensional locations ($L_{head}$ and $L_{hand}$) and postures P($P_{head}$ and $P_{hand}$) of the head and hand are input from the location/posture measurement sections 2001 in step S2, and a location and posture ($L'_{hand}$ and $P'_{hand}$) of the hand relative to the head are computed based on the input locations and postures in step S4. More specifically, a coordinate transform matrix $M_{hand}$ from the reference coordinate system into the hand coordinate system is computed on the basis of the hand location and posture ($L_{hand}$ and $P_{hand}$), a coordinate transform matrix $M_{head}$ from the reference coordinate system into the head coordinate system is computed on the basis of the location and posture ($L_{head}$ and $P_{head}$) of the head, and based on these matrices, a coordinate transform matrix $M'_{hand}$ from the head coordinate system into the hand coordinate system is computed by:

$$M'_{hand} = M_{hand} \cdot M_{head}^{-1} \quad (1)$$

where $M_{head}^{-1}$ is the inverse matrix of $M_{head}$. The relative location and posture ($L'_{hand}$, $P'_{hand}$) of the hand with reference to the head (i.e., in the head coordinate system) can be easily derived from $M'_{hand}$.

In step S6, change velocity $V_{hand}$ (time derivative of $L'_{hand}$) of the hand location $L'_{hand}$, and acceleration $A_{hand}$ (time derivative of velocity $V_{hand}$) are computed. Note that the currently measured location and posture ($L'_{hand}$, $P'_{hand}$) of the hand relative to the head are stored in a predetermined memory for the next velocity and acceleration computations in step S6. In this case, data for two previous measurements suffice. In this specification, a combination of information of the location, posture, time, and the like for the head, and those for the hand input from the location/posture measurement sections 2001 is called "primary information", and the location and posture, and velocity and acceleration of the hand with reference to the head are called "secondary information".

It is checked in step S8 if "secondary information" satisfies a predetermined state transition condition so as to determine transition of state φ. Then, the state transits to another state corresponding to the transition condition in which the "secondary information" is satisfied (step S10). After the transition, the current status, time elapsed from the previous state transition, and current location/posture of the hand and head are outputted (step S12).

Figure 8:
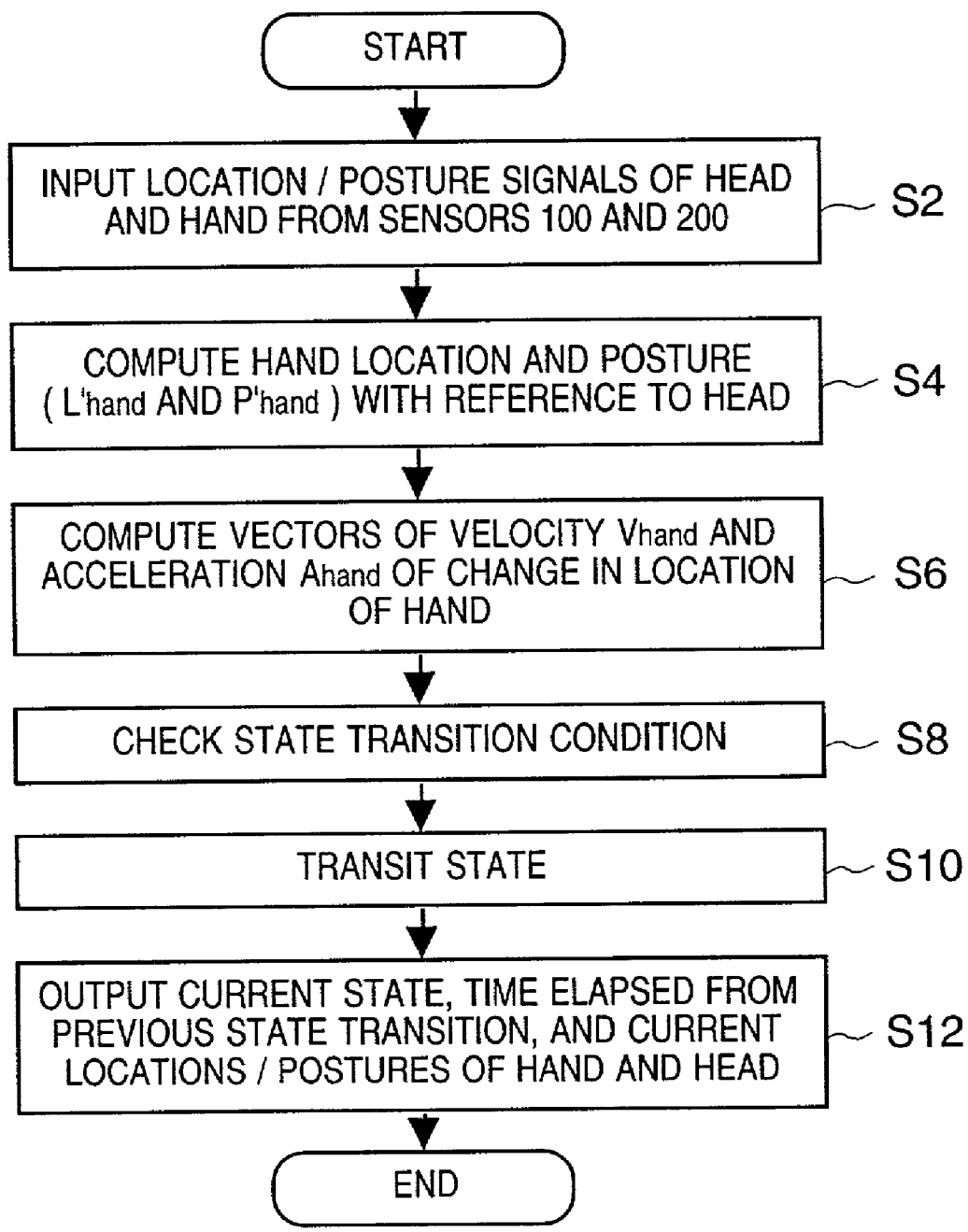
FIG. 8 is a flow chart for explaining the overall sequence of an action analysis section 2002.

The operation of the action analysis section 2002 upon applying the functions shown in FIGS. 7 and 8 to an action (shooting) game will be explained below. In this shooting game, the following five states are defined, and values 0 to 4 are assigned in advance to these states.

Figure 9:
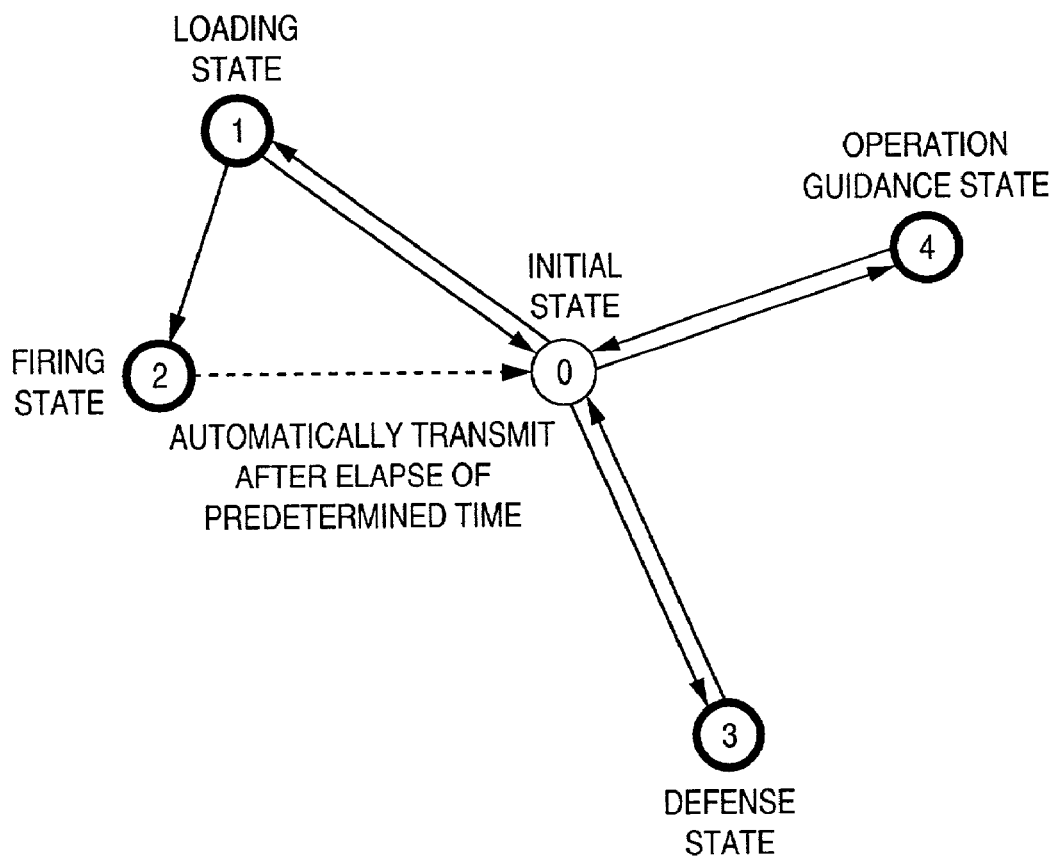
FIG. 9 is a view for explaining state transition in the game system according to the embodiment of the present invention.

0=initial state
1=loading (load a gun) state
2=shooting state
3=defense (protect a player) state
4=operation guidance state In this game apparatus, an action is expressed by a change in state value. As shown in FIG. 9, actions defined in this game apparatus are as follows:

Transition Action
*→* No action (no change in state value)
0→1 Loading action
1→0 Loading cancel action
1→2 Firing action
0→3 Defense action 3→0 Defense cancel action
0→4 Operation guidance action
4→0 Operation guidance cancel action Note that the initial state is restored a predetermined period of time elapsed after the firing state. The output from the action analysis section 2002 includes action state φ and three-dimensional information of the head and hand.

Figure 10:
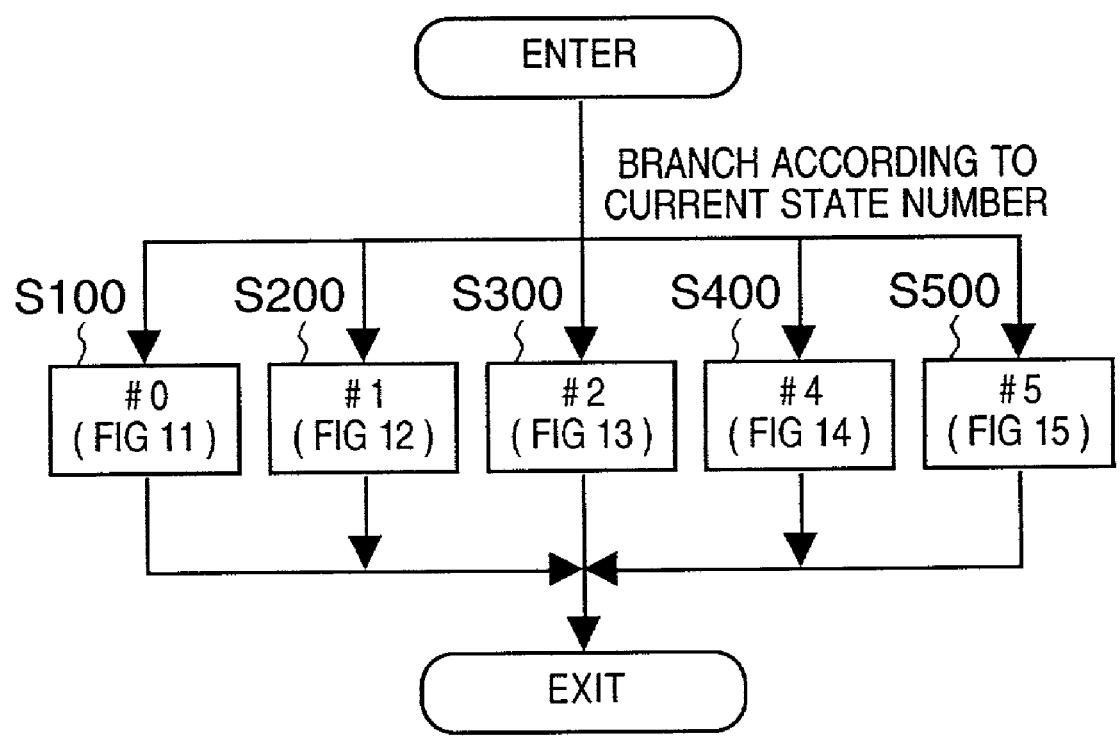
FIG. 10 is a flow chart for explaining details of step S8 in FIG. 8.

FIG. 10 is a flow chart showing the overall state transition condition determination process of the action analysis section 2002. More specifically, the action analysis section 2002 executes one of steps S100, S200, S300, S400, and S500 (respectively shown in detail in FIGS. 11, 12, 13, 14, and 15) in accordance with the current state value φ. Each of steps S100, S200, S300, S400, and S500 outputs the action state value φ after transition, and three-dimensional information of the head and hand.

The control sequence when the current state value=0, i.e., "initial state" is currently set, will be explained below with reference to FIG. 11. There are four states to which the initial state can transit, i.e., state 0 (no transition), state 1 (loading state), state 3 (defense state), and state 4 (operation guidance state), in the game apparatus of this embodiment. In the control sequence shown in FIG. 11, to which of the four states the initial state is to transit is determined in consideration of the amount of backward movement of the hand with respect to the head in the back (z) direction, the deviation of the angle the back-and-forth direction (z-direction in FIG. 6) of the hand makes with the back direction (z-direction in FIG. 5) of the player's head, the deviation of the angle the back of the hand (y-direction in FIG. 6) makes with the back direction of the head, and the like. Hence, the following variables $z_{hand}$, $\alpha_1$, and $\alpha_2$ must be considered in the control sequence shown in FIG. 11.

$z_{hand}$: z-coordinate value of hand location with reference to head coordinate system (see FIG. 5)

$\alpha_1$ angle z-axis of head coordinate system makes with that of hand coordinate system (see FIG. 6)

$\alpha_2$: angle z-axis of head coordinate system makes with y-axis of hand coordinate system Assume that constant values $C_{01}$, $C_{02}$, $C_{03}$, and $C_{04}$ are respectively:

$C_{01}$=0.0 (length)
$C_{02}$=45°
$C_{03}$=150°
$C_{04}$=30°

Figure 16:
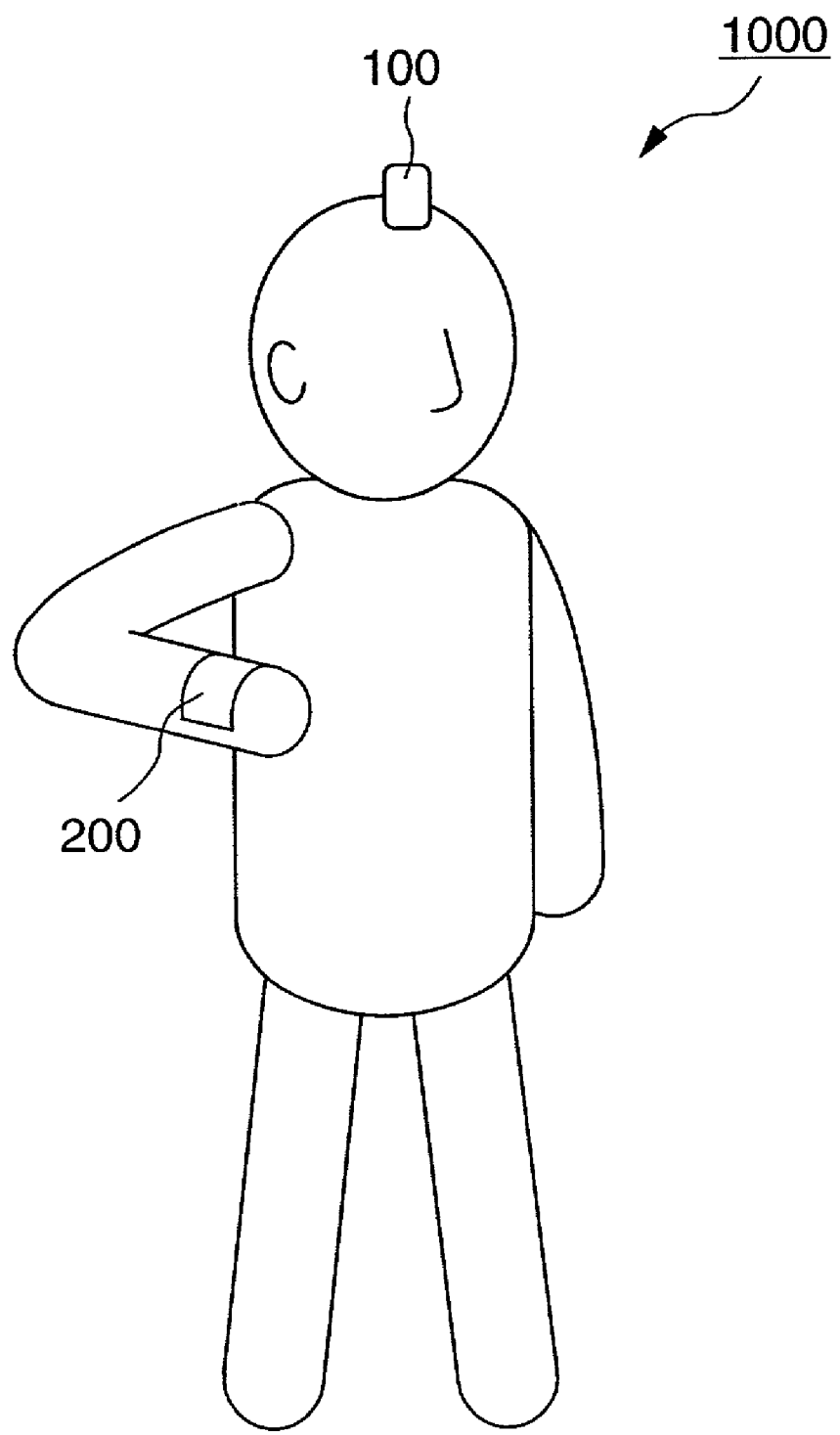
FIG. 16 shows a state example upon outputting a "loading state"

Then, if YES in steps S102 and S104, i.e., $z_{hand} > C_{01}$ and $\alpha_1 < C_{02}$ in other words, if the player has moved the hand backward to a location behind the center of the head ($C_{01}$=0.0) in the back direction of the head while the deviation of the angle the direction of the hand makes with the back direction of the head is kept suppressed to be equal to or smaller than 45° (FIG. 16), it is determined that the player wants to make a loading action. Then, the current time t is saved in a register $t_{01}$ in step S106, the current hand location $L_{hand}$ is saved in a register $L_{01}$ in step S108, and an action state value=1 (loading state) is output in step S110.

Figure 17:
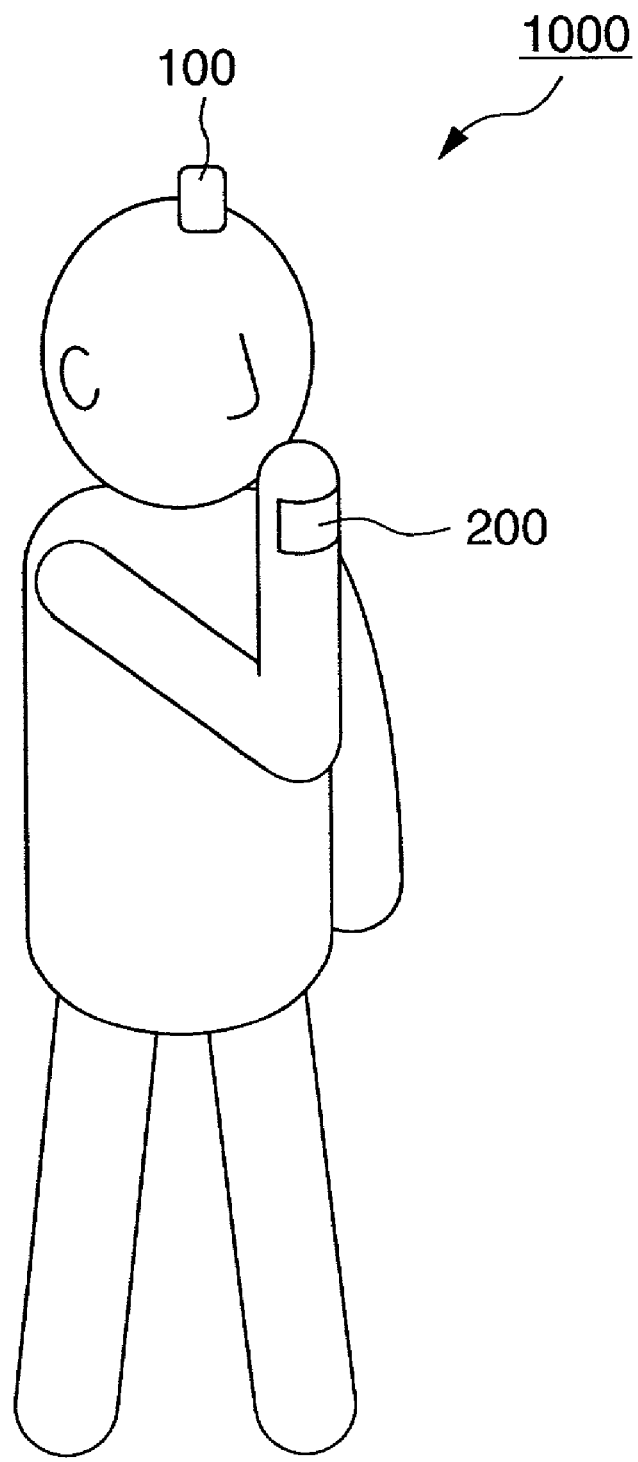
FIG. 17 shows a state example upon outputting a "defense state"

On the other hand, if NO in steps S102 and S104, and YES in step S112, i.e., $z_{hand} \leq C_{01}$ and $\alpha_1 \geq C_{02}$ and $\alpha_2 > C_{03}$ in other words, if the player has moved the hand to a location in front of the central position of the head (FIG. 17) while the deviation of the angle the direction of the hand makes with the back direction of the head is 45° or more, and an angle the direction perpendicular to the back of the hand makes with the back direction of the head is 150° or more, it is determined that the player wants to make a defense action. Then, the current time t is saved in a register $t_{03}$ in step S114, and an action state value=3 (defense state) is output in step S116.

On the other hand, if NO in steps S102, S104, and S112, and YES in step S118, i.e., $z_{hand} \leq C_{01}$ and $\alpha_1 \geq C_{02}$ and $\alpha_2 < C_{04}$ in other words, if the player has moved the hand to a location in front of the central position of the head while the deviation of the angle the direction of the hand makes with the back direction of the head is 45° or more, and an angle the direction perpendicular to the back of the hand makes with the back direction of the head is 30° or less, it is determined that the player wants an operation guidance (i.e., HELP). Then, the current time t is saved in a register $t_{04}$ in step S120, and an action state value=4 (operation guidance state) is output in step S122.

On the other hand, if NO in steps S102, S104, S112, and S118, i.e., $z_{hand} \leq C_{01}$ and $\alpha_1 \geq C_{02}$ and $C_{04} \leq \alpha_2 \leq C_{03}$ it is determined that the player's action is not large enough to issue a command, and the initial state is maintained in step S124.

Figure 12:
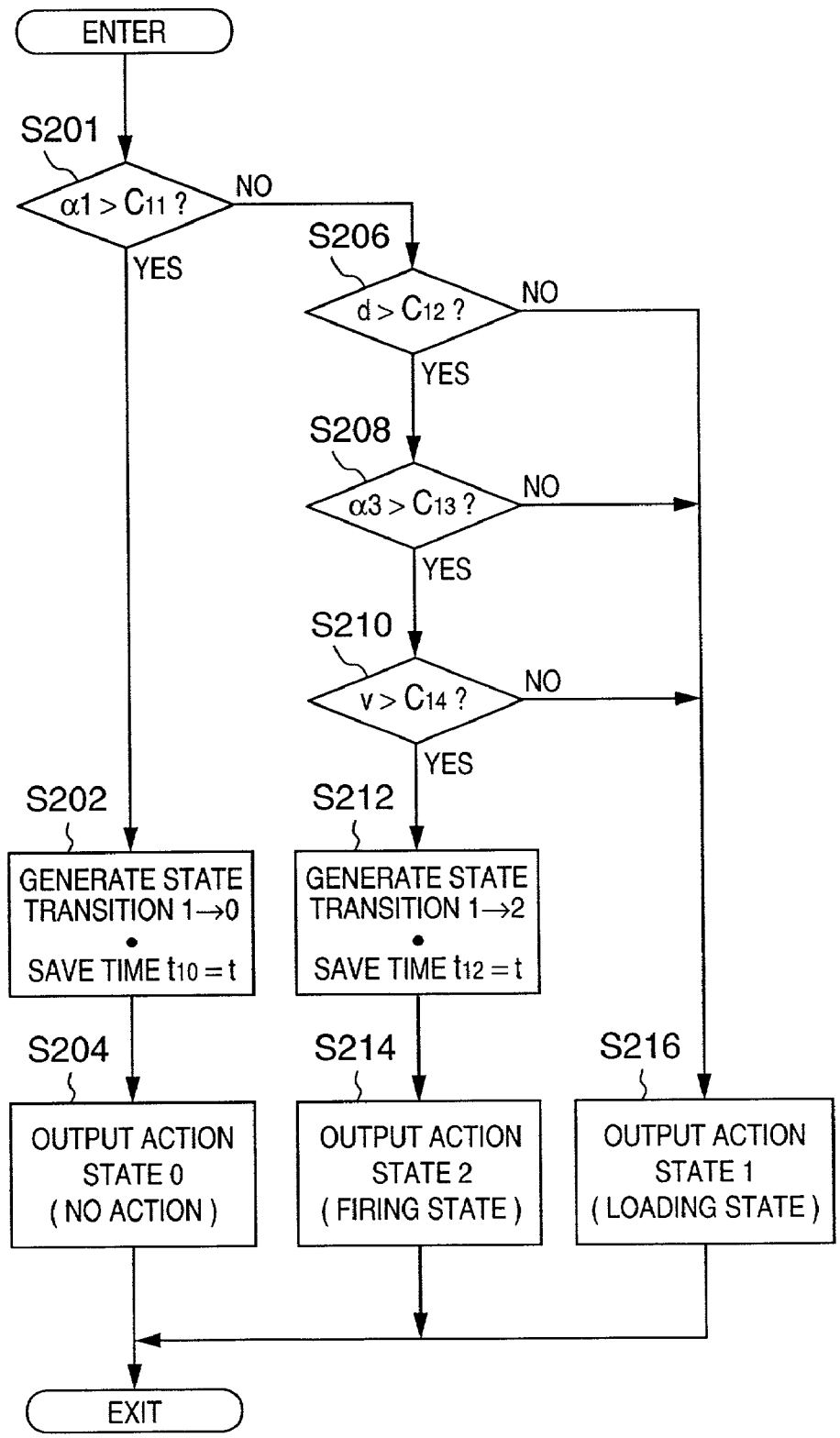
FIG. 12 is a flow chart for explaining details of step S200 in FIG. 10.

The control sequence when the current state is the loading state (=1) will be explained below with reference to FIG. 12. There are three states to which the loading state can transit, i.e., state 0 (initial state), state 1 (no transition), and state 2 (firing state), as shown in FIG. 9. In the control sequence shown in FIG. 12, a hand moving distance d, hand angle $\alpha_3$, and hand moving velocity v are referred to in addition to the aforementioned angle $\alpha_1$. Note that d: distance from hand location $L_0$ to current hand location $L_{hand}$ when state transits from 0 to 1

$\alpha_3$: angle a velocity vector V of hand makes with z-axis of head coordinate system v: moving velocity of hand Assume that constant values $C_{11}$, $C_{12}$, $C_{13}$, and $C_{14}$ are respectively:

$C_{11}$=60° (to be compared with $\alpha_1$)
$C_{12}$=300 mm (to be compared with d)
$C_{13}$=120° (to be compared with $\alpha_3$)
$C_{14}$=300 mm/s (to be compared with v)

Then, if YES in step S201, i.e., $\alpha_1 > C_{11}$ in other words, the deviation of the angle the hand direction makes with the back direction of the head has exceeded 60°, it is determined that the player has made a loading action but does not want to fire. Then, the current time t is saved in a register $t_{10}$ in step S202, and an action state value=0 is output in step S204.

Figure 18:
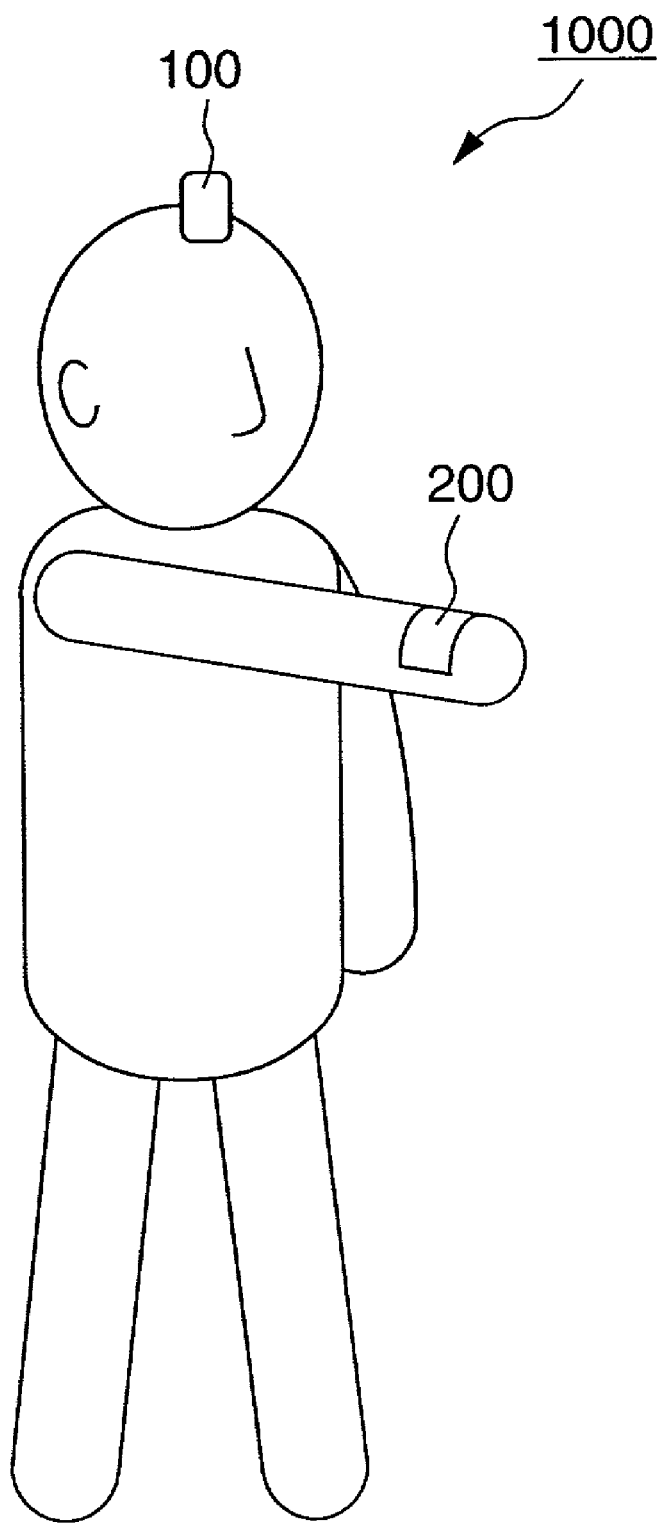
FIG. 18 shows a state example upon outputting a "firing state".

On the other hand, if NO in step S201 and YES in steps S206, S208, and S210, i.e., $\alpha_1 \leq C_{11}$, $d > C_{12}$, $\alpha_3 > C_{13}$, $v > C_{14}$ in other words, if a change in direction of the hand with respect to the head is not large, the hand moving distance is equal to or larger than $C_{12}$ (e.g., 300 mm), the angle the hand moving direction makes with the back direction of the head is equal to or larger than the angle $C_{13}$ (e.g., 120°), and the hand moving velocity is equal to or higher than $C_{14}$ (e.g., 300 mm/s) (FIG. 18), it is determined that the player wants to fire. Then, the current time t is saved in a register $t_{12}$ in step S212, and an action state value=2 (firing state) is output in step S214.

On the other hand, if the above conditions are not satisfied, i.e., $\alpha_1 \leq C_{11}$ and $d \leq C_{12}$ or $\alpha_3 \leq C_{13}$, $v \leq C_{14}$ the loading state is maintained.

Figure 13:
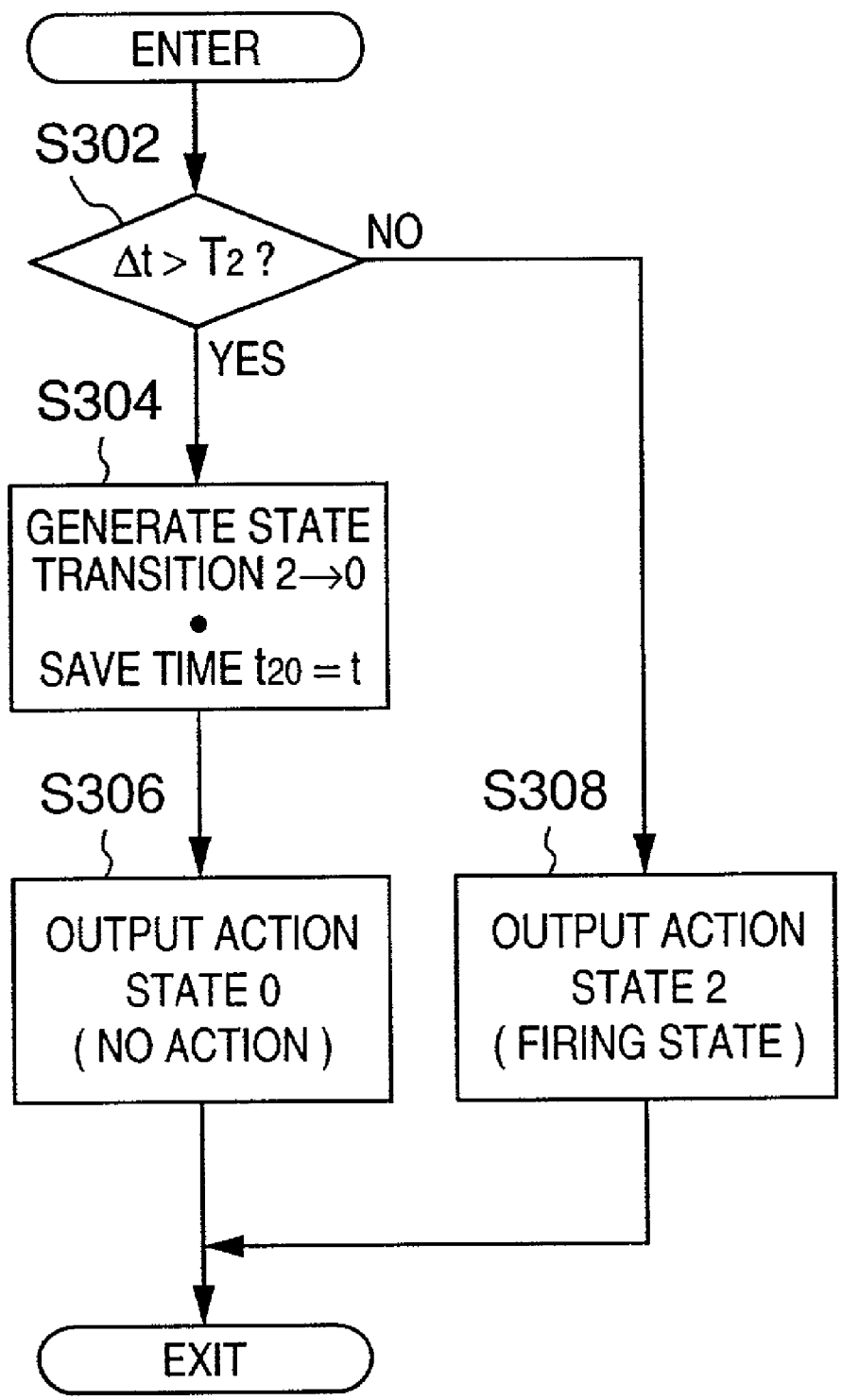
FIG. 13 is a flow chart for explaining details of step S300 in FIG. 10.

When the current state is the firing state (=2), the control sequence shown in FIG. 13 is executed. In the example shown in FIG. 9, the firing state can transit to either the initial state or firing state (no transition). According to the control sequence shown in FIG. 13, if time Δt elapsed after the loading state transits to the firing state is smaller than a constant value $T_2$ (e.g., 200 ms) (NO in step S302), the firing state is maintained in step S308. On the other hand, if time Δt is equal to or longer than $T_2$, the current time is saved in step S304, and the state is returned to the initial state to output that state value in step S306.

In the example in FIG. 9, the initial state is unconditionally restored the predetermined period of time ($T_2$) after the beginning of shooting. Such simple state transition to the initial state is designed for the sake of simplicity upon explaining the rules of the game of the game apparatus of this embodiment. If the game has a complex flow (scenario), more states should be defined in correspondence with that complexity. In such case, more states in addition to the initial state may be defined as those to which the firing state can transit.

Figure 14:
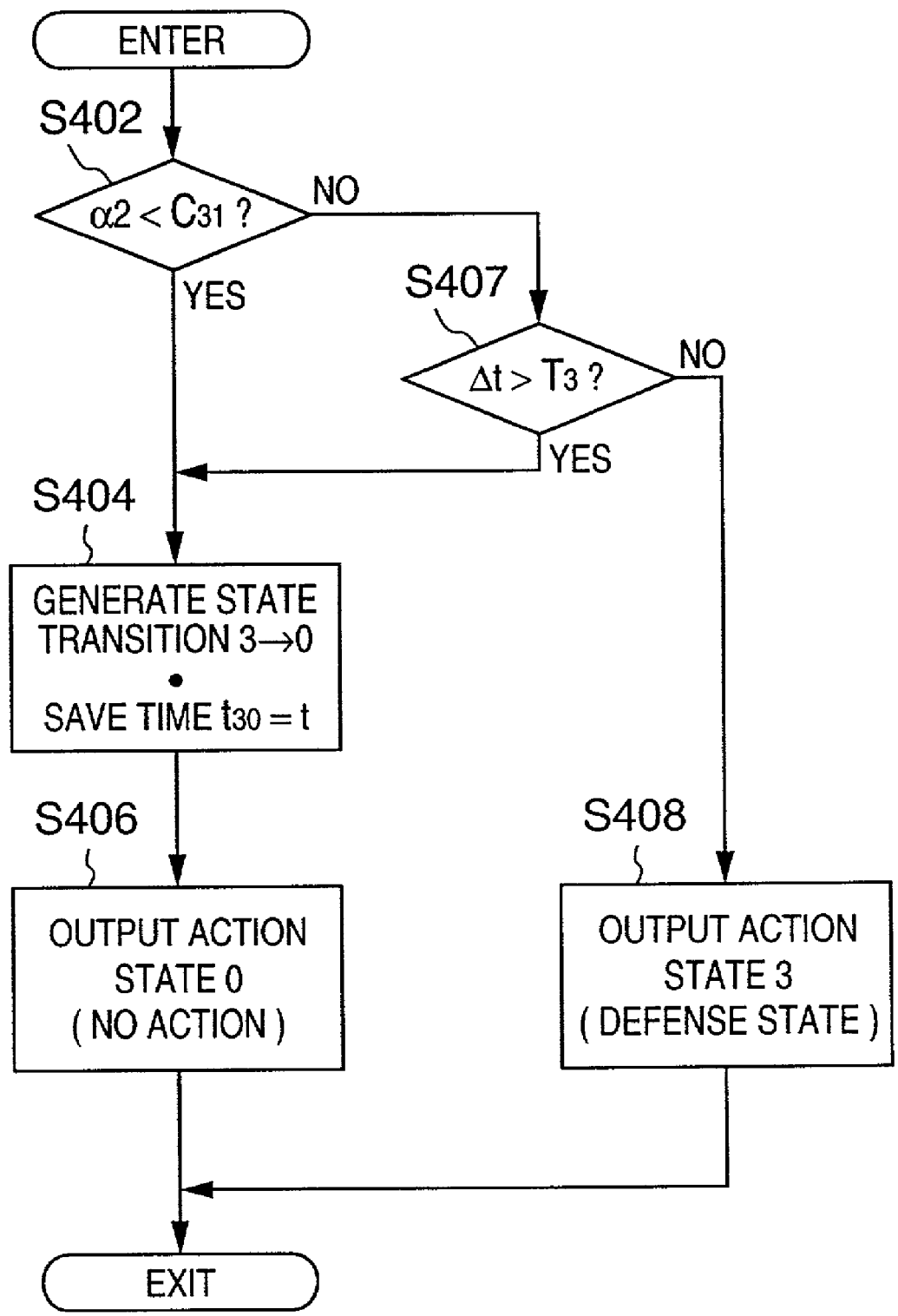
FIG. 14 is a flow chart for explaining details of step S400 in FIG. 10.
Figure 15:
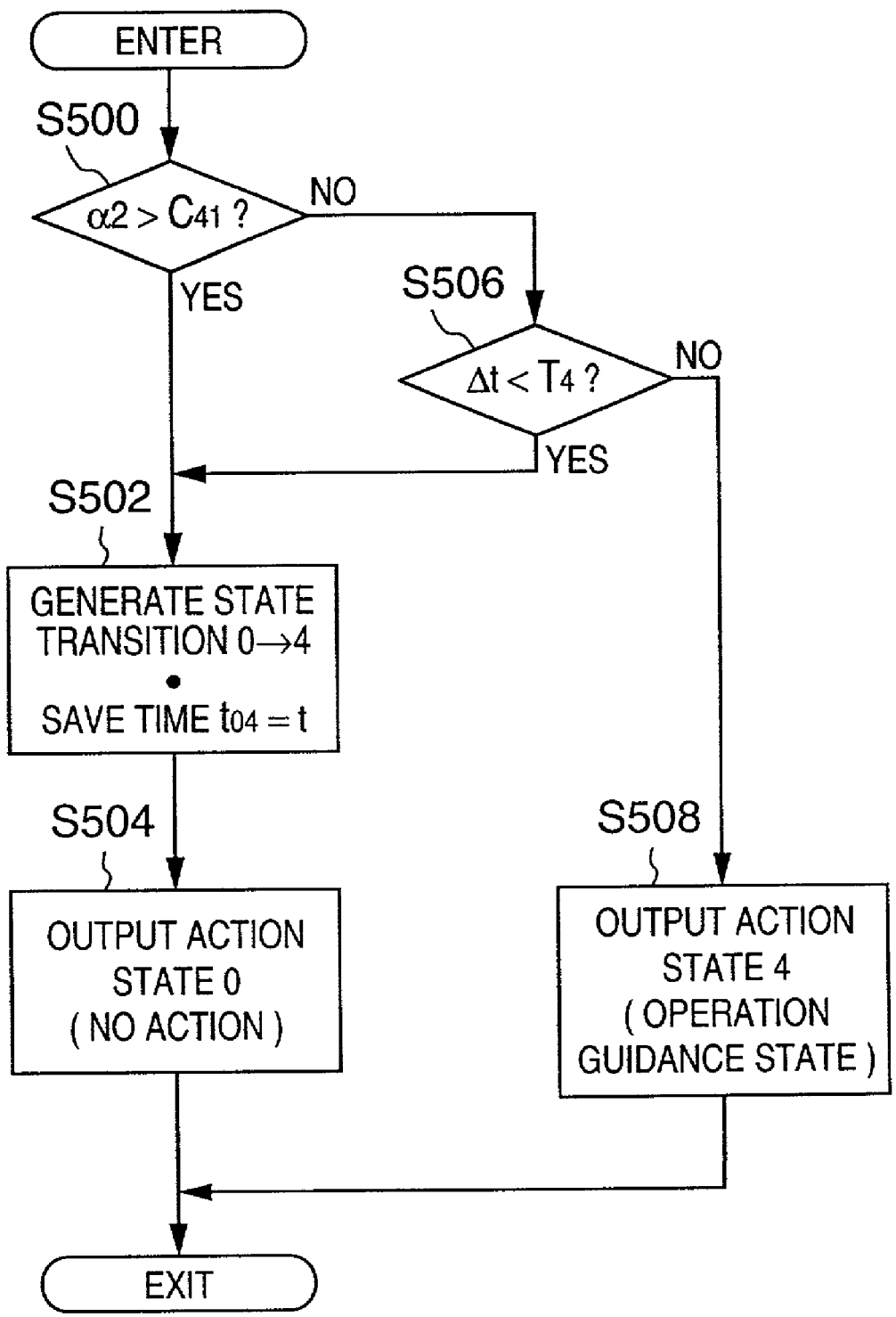
FIG. 15 is a flow chart for explaining details of step S500 in FIG. 10.

When the current state is the defense state (=3), the control sequence shown in FIG. 14 is executed. In the example shown in FIG. 9, states to which the defense state can transit are only the initial state and the defense state (no transition). According to the control sequence shown in FIG. 14, it is checked in step S402 if an angle the posture of the hand makes with that of the head is smaller than a predetermined value $C_{31}$ (e.g., 150°). That is, if $\alpha_2 < C_{31}$ in other words, if an angle the direction of the back of the hand makes with the back direction of the head is set to be less than 150°, it is determined that the defense state is canceled, and the current state is returned to the initial state and the current time is saved in step S404. Furthermore, the initial state (=0) is output in step S406.

On the other hand, if NO in step S402, but if it is determined in step S407 that time Δt elapsed after the previous state transited to the defense state is equal to or longer than a predetermined time $T_3$, the flow advances to step S404 to return the current state to the initial state like in the case wherein a sufficiently long time has elapsed from the firing state.

Furthermore, if NO in steps S402 and S407, i.e., $\alpha_2 \geq C_{31}$ and $\Delta T \leq T_3$ the defense state is maintained.

Figure 11:
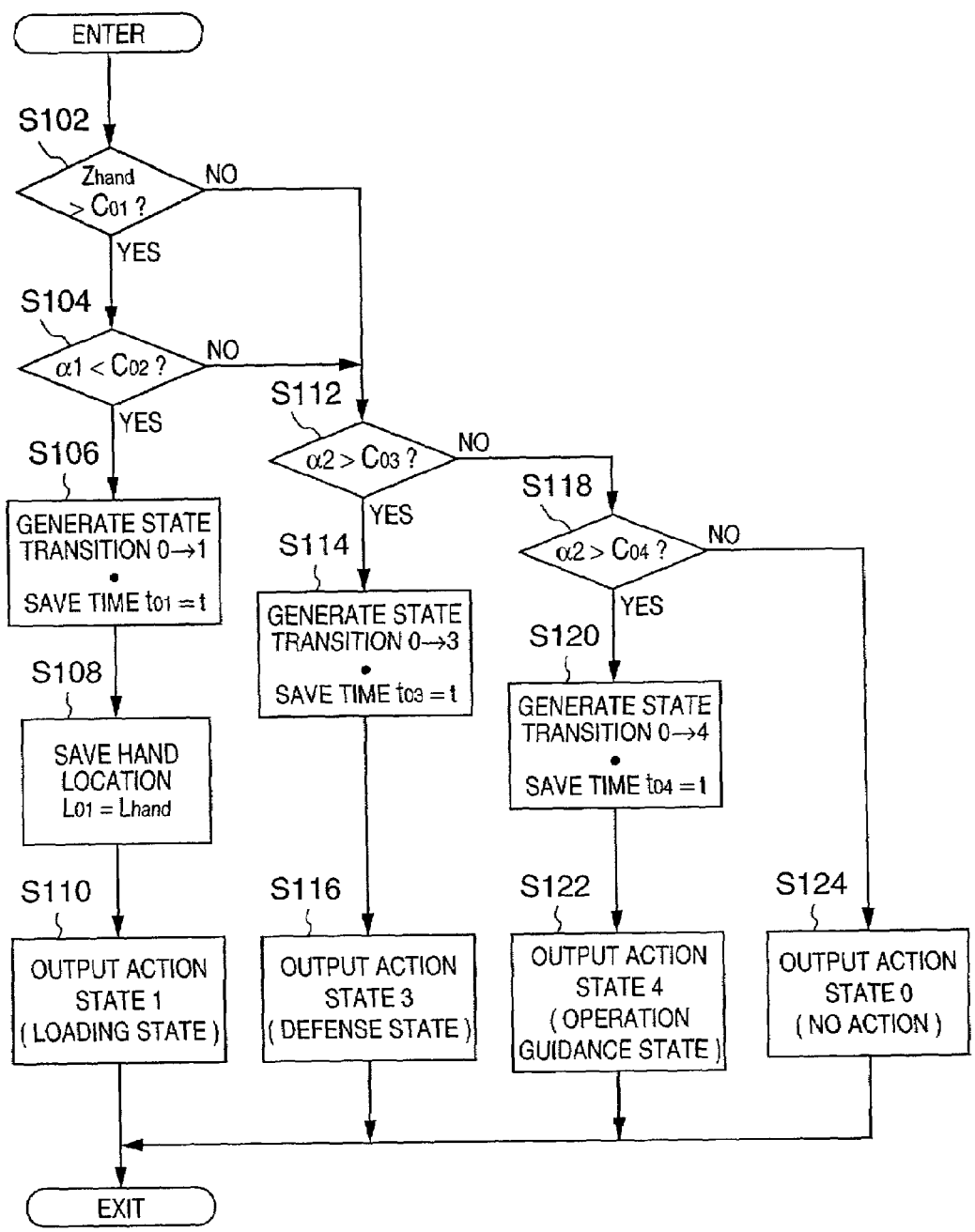
FIG. 11 is a flow chart for explaining details of step S100 in FIG. 10.

If the state transits to "operation guidance state" in step S122 in FIG. 11, i.e., $z_{hand} \leq C_{01}$ and $\alpha_1 \geq C_{02}$ and $\alpha_2 \leq C_{04}$ in other words, if the player moves the hand to a location in front of the central position of the head in the back direction of the head while the deviation of the angle the direction of the hand makes with the back direction of the head is 45° or more, and an angle the direction perpendicular to the back of the hand makes with the back direction of the head is 30° or less, this means that the player is watching the back or joint of the hand. In such case, since a state value=4 is output to the game apparatus 3000, the apparatus 3000 displays a HELP window on the predetermined display device. Note that this display device is preferably a head-mounted display device (HMD). If the HMD is used, the player need not move the head upon watching the HELP window, and the control sequence (FIG. 15) for maintaining the "operation guidance state" need not be complicated.

Note that the HELP window may be either two- or three-dimensional display, or may be displayed in either a VR or AR environment, as long as it matches the current environment. In this embodiment, since the head location/posture sensor is attached to the player, it is preferable to display the HELP window in an AR environment in terms of efficient use of the sensor 100.

With the above arrangement, a command obtained by analyzing the user's action in consideration of user's will is supplied to the game apparatus 3000, and an image corresponding to the command is displayed within the virtual space displayed on the display unit 4000.

More specifically, a "target" is randomly displayed within the virtual space presented to the user by the game apparatus 3000, and the user shoots it by his or her actions. Since the user's action is reflected as a counteraction against the "target", the game with very high reality can be implemented.

Various modifications of the present invention can be made.

Modification 1:

In the above embodiment, commands and states shown in FIG. 9 are used. However, the present invention is not limited to such specific commands and states. That is, the user interface of the present invention is not limited to a game apparatus environment. The present invention can be applied to any other environments as long as the user's or player's actions are required to be used in place of commands (or instructions) upon presenting CG data to the user or player.

For example, the present invention may be applied to a sign language recognition user interface, a user interface for manipulating home electronic products, a user interface for manipulating industrial machines (special vehicles for construction work, factory lines), a user interface for physically handicapped person assist apparatuses (assist bed, motored wheelchair), and the like.

Modification 2:

When the present invention is applied to a game apparatus, the game to which the present invention is applied is not limited to the rules shown in FIG. 9. The present invention can be applied to more or less states (commands). Also, state transition is not limited to FIG. 9.

Modification 3:

In the game system of the above embodiment, since the action states have one-to-one correspondence with commands or instructions, the command conversion section 2003 can directly convert an action state into a command. However, the present invention is not limited to such specific system. That is, the command conversion unit 2003 is designed to improve compatibility to the game apparatus 3000 connected to the unit 2000. In other words, the game apparatus 3000 can be an existing versatile game apparatus. The existing game apparatus has an existing command system. The command conversion section 2003 is designed to have a table for receiving outputs (state, velocity, acceleration) from the action analysis section 2002, and converting them into a command system for the game apparatus 3000. This table is rewritable, and the table contents are rewritten in correspondence with the game apparatus 3000 used. In this way, the unit 2000 can be applied to a plurality of different types of game apparatuses having different command systems without changing the arrangement and operation of the unit 2000.

Modification 4:

In the above embodiment, sensors are attached to the head and hand. However, the present invention is not limited to this. That is, to achieve the objective for issuing a command by an action, the sensor may be attached to the fingertip, arm, leg, thigh, knee, or shin in place of the hand. For example, as an example of a sensor to be attached to finger joints, a so-called "glove type hand joint angle measurement device" has been put into practice.

Modification 5:

In the above embodiment, the command conversion section 2003 receives an action identifier from the analysis section 2002, and outputs a command signal corresponding to an action. Upon receiving this command, the command signal system of the programs and apparatuses (game apparatus and the like) that use the command signal is defined in the game apparatus 3000. However, the present invention is not limited to such specific command signal. As the command signal, the following formats are available. That is, to output a command signal as an electrical or optical signal;

to implement command conversion as a function program on a computer, and output data to be written in a predetermined storage area by the function program to the conversion unit 2003 as a command signal;

to implement command conversion as a function program on a computer, and launch a callback function which corresponds to a command in advance to use it as a command signal output; and to implement command conversion as a function program on a computer, and generate an interrupt signal which corresponds to a command in advance to use it as a command signal output.

Modification 6:

In the above embodiment, magnetic sensors are used as the sensors. Alternatively, the location/posture may be measured using an ultrasonic wave, mechanically, or by means of an image process.

To restate, according to the present invention, a user interface apparatus, user interface method, and game apparatus, to which the user (player) can easily sensuously become accustomed, and which can accurately recognize instructions (commands) that the user (player) intended can be provided.

As many apparently widely different embodiments of the present invention can be made without departing from the spirit and scope thereof, it is to be understood that the invention is not limited to the specific embodiments thereof except as defined in the appended claims.

What is claimed is:

1. A user interface apparatus comprising:
    a first sensor adapted to be attached to a head of a user, wherein said first sensor detects a position and an orientation of the head;
    a second sensor adapted to be attached to a second portion of the user, which is different from the head;
    an estimating unit arranged to estimate a relative position of the second portion with respect to the position and orientation of the head in accordance with results of detection by said first and second sensors, wherein said estimating unit determines the relative position by transforming coordinates between a head coordinate system that is based on the position and orientation of the head detected by said first sensor and another coordinate system that is based on information detected by said second sensor;
    a generation unit arranged to generate command information on the basis of a transition of the estimated relative position; and
    an image generating unit arranged to generate an image on the basis of said command information.

2. The apparatus according to claim 1, wherein the second portion is a hand.

3. The apparatus according to claim 1, wherein said second sensor detects a location and orientation of the second portion.

4. The apparatus according to claim 1, wherein the action information includes information which pertains to an orientation of the second portion with respect to the orientation of the first portion.

5. The apparatus according to claim 1, wherein the action information includes information which pertains to a moving direction of a location of the second portion with respect to the orientation of the first portion.

6. The apparatus according to claim 1, further comprising:
    means for storing a value of the relative position of the second portion with respect to the first portion, and a plurality of state values which are defined in advance as a result of transition of the value; and
    means for storing a plurality of different user instruction values corresponding to the plurality of state values.

7. The apparatus according to claim 1, wherein said determination unit decomposes the determined user instruction into a plurality of instruction operands, and outputs the operands.

8. The apparatus according to claim 1, further comprising a third sensor for detecting a bent angle of a finger.

9. The apparatus according to claim 1, further comprising a head-mounted display for displaying the image generated by said image generating unit.

10. A user interface method for outputting a user instruction to a predetermined apparatus or program, comprising:
    a step adapted to detecting a location of a head of a user and a location of a second portion of the user, which is different from the head, by using a first sensor adapted to be attached to the head and a second sensor adapted to be attached to the second portion, wherein the first sensor adapted to detect a position and an orientation of the head;
    a step of estimating a relative position of the second portion with respect to the position and orientation of the head in accordance with results of detection by the first and second sensors in said detecting step, wherein said estimating step determines the relative position by transforming coordinates between a head coordinate system that is based on the position and orientation of the head adapted to be detected by the first sensor and another coordinate system that is based on information detected by the second sensor;
    a step of generating command information on the basis of a transition of the estimated relative position; and
    a step of determining an instruction by the user corresponding to the generated command information and outputting the determined user instruction to the apparatus or program.

11. A computer readable storage medium, which stores a program for controlling an apparatus to output a user instruction to a predetermined apparatus or program, the stored program comprising:

a program step adapted to detecting a location of a head of a user and a location of a second portion of the user, which is different from the head, by using a first sensor adapted to be attached to the head and a second sensor adapted to be attached to the second portion, wherein the first sensor adapted to detect a position and an orientation of the head;

a program step of estimating a relative position of the second portion with respect to the position and orientation of the head in accordance with results of detection by the first and second sensors in said program step of detecting, wherein said estimating step determines the relative position by transforming coordinates between a head coordinate system that is based on the position and orientation of the head adapted to be detected by the first sensor and another coordinate system that is based on information detected by the second sensor;

a program step of generating command information on the basis of a transition of the estimated relative position; and a program step of determining an instruction by the user corresponding to the generated command information and outputting the determined user instruction to the predetermined apparatus or program.

* * * * *